May 24, 1949.  H. N. RIDER  2,471,240
HEAT ACTUATED DEVICE
Filed Feb. 3, 1945  2 Sheets-Sheet 1

INVENTOR
Harry N. Rider
BY
W.B.Harpman
ATTORNEY

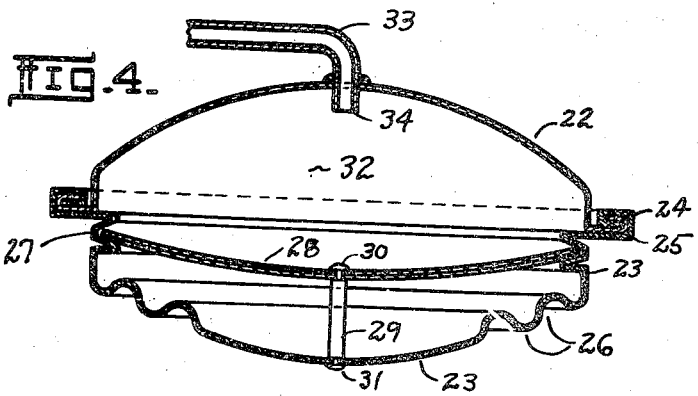
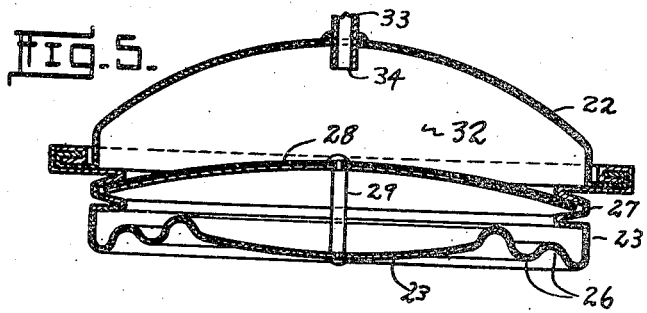
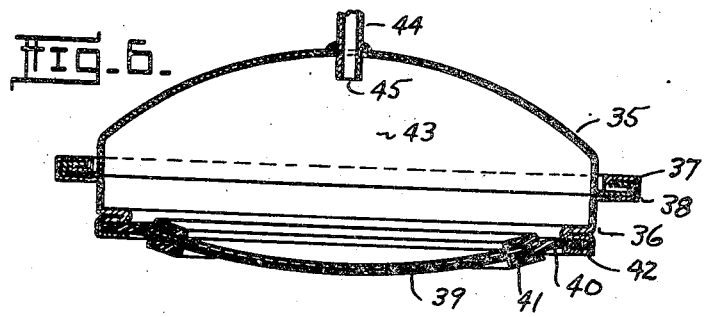
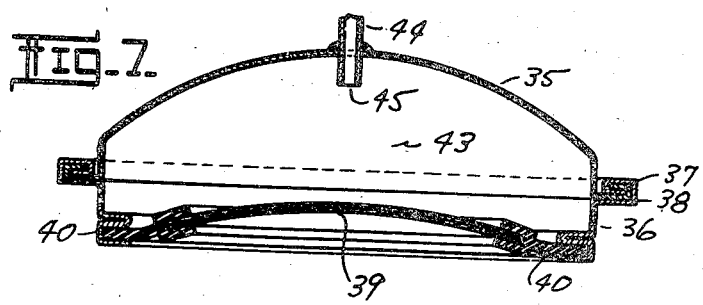

Patented May 24, 1949

2,471,240

UNITED STATES PATENT OFFICE 2,471,240

HEAT ACTUATED DEVICE

Harry N. Rider, Youngstown, Ohio, assignor to "Automatic" Sprinkler Company of America, Youngstown, Ohio, a corporation of Delaware Application February 3, 1945, Serial No. 576,063

3 Claims. (Cl. 297—15)

This invention relates to a pneumatic and bimetallic thermostat capable of dual action as an air thermostat for use and operation under changes of temperature to automatically cause the thermostat to function.

The invention relates to a particular form of air thermostat susceptible to changes of temperature. The said thermostat is so constructed as to initiate a pneumatic impulse upon a particular change of temperature such as may be occasioned by a fire.

The principal object of the invention is the provision of an air thermostat so constructed that it will operate automatically and unfailingly upon the known principle of the expansion of a confined body of air when heated, which principle is known in the art as the "rate-of-rise" principle, and upon the attainment of a predetermined or fixed temperature, the mechanism for both actions comprising a single unit.

A further object of the invention is the provision of an air thermostat of dual action characteristics which is extremely simple in construction and comprises a minimum number of parts.

A still further object of the invention is the provision of an air thermostat which is adapted to initiate a pneumatic impulse upon the expansion of a confined body of air by the heating thereof, and which is provided with a bimetallic element adapted to alter its shape at a given temperature so as to create a pneumatic impulse when the temperature reaches the predetermined degree.

The heat actuated device shown and described herein has been designed to operate fire protection equipment such as sprinkler systems and fire detection systems such as are commonly employed in the protection of various buildings, hangars and other enclosures.

With the foregoing and other objects in view which will appear as the description proceeds, the inventions resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein—

Figure 4 is a cross sectional side elevation of a modified form of heat actuated device showing the same in normal position.

Figure 5 is a cross sectional side elevation of the heat actuated device illustrated in Figure 4 showing the same in operating position.

Figure 6 is a cross sectional side elevation of a further modification of the heat actuated device showing the same in normal position.

Figure 7 is a cross sectional side elevation of the heat actuated device illustrated in Figure 6 and shows the device in operating position.

Figure 1:
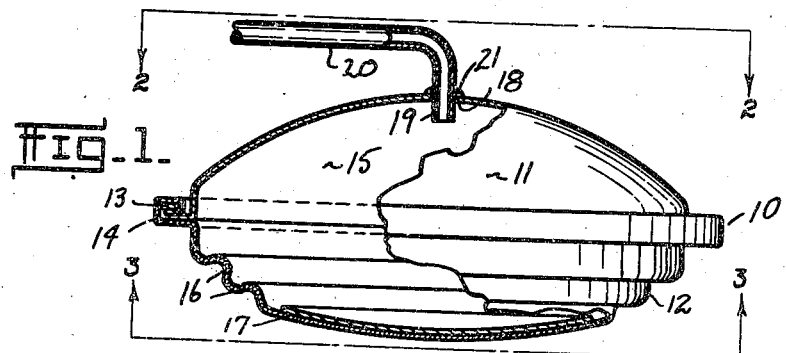
Figure 1 is a side elevation of a heat actuated device with parts in cross section and parts broken away.
Figure 2:
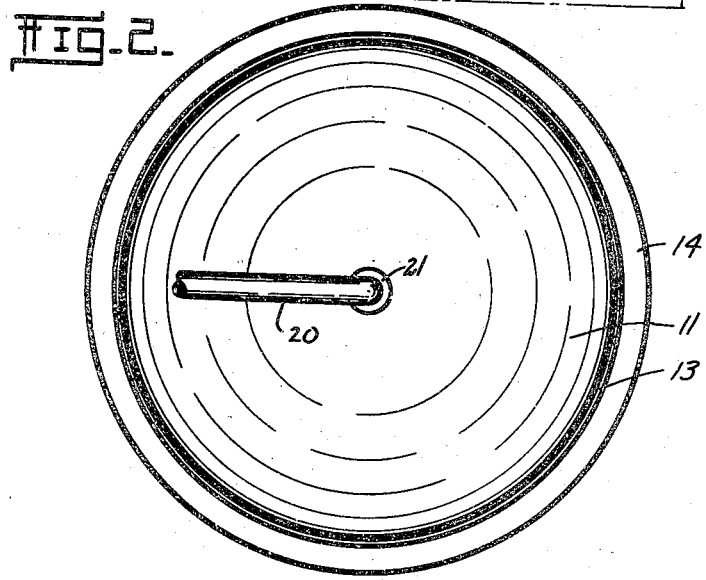
Figure 2 is a top plan view of the heat actuated device illustrated in Figure 1.
Figure 3:
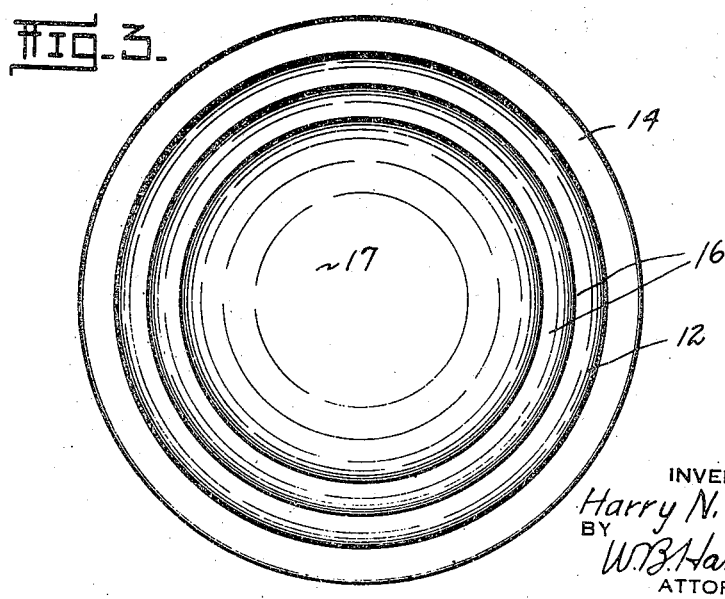
Figure 3 is a bottom elevation of the heat actuated device shown in Figure 1.

By referring to the drawings and Figures 1, 2 and 3 in particular it will be observed that a heat actuated device of the type known in the art as an air thermostat has been disclosed and which device is primarily intended to operate on the "rate-of-rise" principle, whereby a confined body of air expanding by reason of rising temperature about the thermostat is utilized to operate a valve releasing mechanism and/or a signal as by the flexing of a pressure sensitive diaphragm therein.

In Figure 1 the heat actuated device is generally indicated by the numeral 10 and may be seen to be formed of an upper shell 11 and a lower shell 12, which shells, when assembled to one another as by the engagement of annular flanges 13 and 14 formed on the upper and lower shells 11 and 12, respectively, form an air tight chamber 15. It will be observed that the lower shell 12 is formed with a plurality of annular corrugations 16 and that it includes a relatively large bimetallic disc 17 flexibly positioned with respect to the remainder of the heat actuated device 10 by reason of the plurality of annular corrugations 16. The relatively large bimetallic disc 17 is illustrated in Figures 1 and 3 in its normal shape and it is adapted upon the attainment of a predetermined fixed temperature to alter its shape by reversing its normal curve and thereby move into the chamber 15.

An opening 18 is provided in the uppermost center section of the upper shell 11 and an end 19 of a tube 20 is positioned through the opening 18 and is soldered or otherwise affixed in the opening 18 in an air tight manner. The solder is indicated by the numeral 21. The tube 20 provides means for directing increased air pressure from the chamber 15 to a suitable release device and/or signal where the increased air pressure is utilized to actuate the same. As such releasing devices and/or signals are well known in the art and their constructions, therefore, understood, they are not illustrated or further described herein.

It will thus be seen that a heat actuated device comprising an air thermostat has been disclosed which is capable of originating an increase in pressure in the chamber 15 and tube 20 thereof upon subjection to a rise in temperature such as occasioned by a fire, and further which will create an additional pneumatic impulse or further increase in air pressure upon reaching a predetermined temperature by reason of the snap action of the bimetallic section 17 of the lower shell 12 of the device.

The construction of the air thermostat, therefore, provides for the positive actuation of a release mechanism and/or signal to which it may be attached as, for example, if the regular increase of air pressure in the air thermostat is incapable of actuating the release or signal the snap action of the bimetallic portion of the air thermostat will insure such operation due to the positive pneumatic impulse created thereby.

It is obvious that modifications of the construction illustrated in Figures 1, 2 and 3 and heretofore described are possible and in Figures 4 and 6 of the drawings two such modifications are illustrated.

By referring to Figures 4 and 5 of the drawings a modified form of heat actuated device is illustrated and comprises an upper shell 22 and a lower shell 23 assembled in oppositely disposed relation to one another and affixed to one another by attachment of annular flanges 24 and 25 formed on the shells 22 and 23, respectively. The lower shell 23 is formed of a flexible material and is provided with a plurality of annular corrugations 26 to enhance the flexibility of the majority of the lower shell 23. An annular crimped channel 27 is formed in the side sections of the lower shell 23 adjacent the annular flange 25 thereof and forms means for positioning a bimetallic member 28 which is loosely positioned therein so that its positioning means will in no way interfere with its tendency to alter its shape upon attaining a predetermined fixed temperature. A connecting rod 29 is affixed to a central point of the bimetallic member 28 as by means of a rivet 30 and is also affixed to a central point of the central section of a lower shell 23 as by a rivet 31 so that this central section of the lower shell 23 may be moved by the action of the bimetallic member 28.

By referring to Figure 5 of the drawings it will be observed that this action is illustrated and that the bimetallic member 28 is shown in heat actuated position whereby it has caused the central section of the lower shell 23 to be moved upwardly into a chamber 32 defined by the assembled shells 22 and 23 of the heat actuated device. It is obvious that when this action occurs an increased pneumatic impulse is generated, which impulse is conveyed from the chamber 32 of the air thermostat by means of a tube 33, an end 34 of which is placed in communication with the chamber 32.

It will thus be seen that the modified form of heat actuated device illustrated in Figures 4 and 5 is capable of two pneumatic actions, one being the generation of the pressure within the chamber 32 of the air thermostat as by the rate-of-rise principle and the other being the pneumatic impulse created by the operation of the bimetallic member 28 upon the attainment of a predetermined fixed temperature.

By referring now to Figures 6 and 7 of the drawings a further modification of the heat actuated device may be seen and it will be observed that an upper shell 35 has been attached to a lower shell 36 by means of the engagement of annular flanges 37 and 38 formed on the shells 35 and 36, respectively, and that the majority of the lower shell 36 consists of a bimetallic disc 39 flexibly attached, by means of an annular flexible band 40, to the annular side portion of the lower shell 36. As illustrated in Figures 6 and 7 this annular flexible band 40 consists of a rubber-like structure vulcanized at points 41 to the edge of the bimetallic disc 39 and in turn attached to the annular side portion of the lower shell 36 as by being crimped in a channel 42 formed therein. In Figure 6 the bimetallic disc 39 is shown in its normal form and it will be obvious that a chamber 43 defined by the upper and lower shells 35 and 36, respectively, will function as a conventional air thermostat operating on the rate-of-rise principle and confine an increase in air pressure which may be utilized for actuating a release and/or signal. A tube 44 serves as a means of communication with the chamber 43 as illustrated.

By referring to Figure 7 of the drawings the action of the bimetallic disc 39 may be seen, it being observed that upon its attainment of a predetermined temperature the bimetallic disc 39 has reversed its normal shape and in so doing moved upwardly into the chamber 43 of the air thermostat and created an additional pneumatic impulse thereby. It will also be seen that the annular flexible band 40 has adapted itself to this altered shape of the bimetallic disc 39 and at the same time continues to form an air tight shell between the disc 39 and the annular side sections of the lower shell 36.

It will thus be seen that a heat actuated device and several modifications thereof has been disclosed, which heat actuated device is capable of effecting the positive operation of a pneumatic release and/or signal mechanism which may be connected thereto by reason of its dual operating characteristics.

Having thus described my invention, what I claim is:

1. A heat actuated device comprising a two part walled structure defining an air tight enclosure, one wall of said enclosure being flexible, tubular means in communication with the other of said walls, the flexible wall portion of the said structure consisting partially of a disc-like centrally positioned bimetallic member capable of altering its shape upon attainment of a given temperature, an outer annular portion of the said flexible wall surrounding the centrally positioned disc-like bimetallic member being of a single thin metal to provide increased flexibility.

2. A heat actuated device comprising a two part structure defining an air tight enclosure, tubular means in communication therewith, one portion of the said structure consisting of a thin flexible metallic shape having a secondary member of different metal affixed to a central area thereof and forming with the said shape a bimetallic member capable of altering its shape so as to reduce the volume of the said enclosure upon attainment of a given temperature, an outer annular portion surrounding the central bimetallic portion being of a single thin metal to provide increased flexibility.

3. A heat actuated device comprising a structure defining an air tight enclosure, tubular means in communication therewith, a portion of said structure forming a bellows-like section, a bimetallic member forming a central part of said bellows-like section and adapted to move the said section into the said enclosure upon attaining a fixed temperature, an outer annular portion surrounding the central bimetallic member being of a single thin metal to provide increased flexibility.

HARRY N. RIDER.

REFERENCES CITED

The following references are of record in the file of this patent:

UNITED STATES PATENTS

| Number | Name | Date |
| --- | --- | --- |
| 416,947 | Powers | Dec. 10, 1889 |
| 1,633,908 | Schnepp | June 28, 1927 |
| 1,657,353 | Francke | Jan. 24, 1928 |
| 1,788,048 | Carnahan | Jan. 6, 1931 |
| 1,897,155 | Vaughn | Feb. 14, 1933 |
| 2,146,731 | Goodale | Feb. 14, 1939 |
| 2,239,540 | Spencer | Apr. 22, 1941 |
| 2,252,946 | Persons | Aug. 19, 1941 |
| 2,318,480 | Griffith | May 4, 1943 |